United States Patent
Knauft et al.

(10) Patent No.: US 8,526,945 B2
(45) Date of Patent: Sep. 3, 2013

(54) TRACKING AND PAGING AT BOUNDRIES IN LTE NETWORKS

(75) Inventors: James P. Knauft, Warrenville, IL (US); Omar H. Salvador, Wheaton, IL (US); Ranga P. Tota, Naperville, IL (US)

(73) Assignee: Alcatel Lucent, Paris (FR)

( * ) Notice: Subject to any disclaimer, the term of this patent is extended or adjusted under 35 U.S.C. 154(b) by 157 days.

(21) Appl. No.: 13/065,859

(22) Filed: Mar. 31, 2011

(65) Prior Publication Data
US 2012/0252451 A1    Oct. 4, 2012

(51) Int. Cl.
*H04W 4/00*    (2009.01)
(52) U.S. Cl.
USPC ........................ 455/435.1; 455/458
(58) Field of Classification Search
None
See application file for complete search history.

(56) References Cited

U.S. PATENT DOCUMENTS

| | | | |
|---|---|---|---|
| 8,271,001 B2* | 9/2012 | Yin et al. | 455/458 |
| 2006/0258386 A1* | 11/2006 | Jeong et al. | 455/525 |
| 2008/0102831 A1* | 5/2008 | Ore | 455/435.1 |
| 2010/0029298 A1* | 2/2010 | Iwamura et al. | 455/456.1 |
| 2010/0075698 A1* | 3/2010 | Rune et al. | 455/458 |
| 2010/0285816 A1* | 11/2010 | Vos et al. | 455/456.1 |
| 2010/0317349 A1* | 12/2010 | Serravalle | 455/440 |
| 2011/0098051 A1* | 4/2011 | Kamalaraj et al. | 455/450 |
| 2011/0105153 A1* | 5/2011 | Miklos et al. | 455/456.5 |
| 2012/0071167 A1* | 3/2012 | Bhandari | 455/443 |
| 2012/0210397 A1* | 8/2012 | Suh et al. | 726/3 |

* cited by examiner

*Primary Examiner* — German Viana Di Prisco
(74) *Attorney, Agent, or Firm* — Carmen Patti Law Group, LLC (57) ABSTRACT

A method, in one example, comprising the steps of receiving a tracking area identifier indicating a tracking area where a user equipment (UE) is located, and updating a current tracking area of the UE based on whether the tracking area identifier indicates that the UE is currently in a previously visited tracking area.

17 Claims, 10 Drawing Sheets

TRACKING AND PAGING AT BOUNDRIES IN LTE NETWORKS

TECHNICAL FIELD

This invention relates generally to tracking user equipment in a long term evolution network and more particularly to efficient tracking area updating and paging of a user equipment.

BACKGROUND

A service area of a long term evolution (LTE) network is typically broken up into geographic regions known as tracking areas. An eNodeB (eNB) is composed of one or more cell sites and each cell site within an LTE network is associated with a tracking area. After user equipment (UE) is attached to an LTE network, the UE transmits a tracking area update (TAU) request when it detects that it has entered a tracking area where it is not registered. A mobility management entity (MME) of the LTE network receives the TAU requests and provides the UE with an updated list of tracking areas where it is now registered. In cases where the UE is at a border of two or more tracking areas, however, the UE may rapidly toggle between the cells of adjacent tracking areas. As the UE toggles, it may generate a TAU request each time it toggles between cells of the adjacent tracking areas. This phenomenon is known as the "ping-pong" effect. A UE exhibiting the "ping-pong" effect may generate a high number of TAU requests that may result in a drop in network capacity. Given the unusually high rate of TAU requests generated under these conditions, a relatively small number of UEs exhibiting this behavior may overwhelm a network with TAU requests. The increased message traffic and CPU usage required to handle the flood of TAU request messages may have a significant negative impact on overall network capacity.

A previous method of addressing the "ping-pong" effect involved allowing a service provider to provision a set of neighbor tracking areas associated with each tracking area. The MME would include the provisioned neighbor tracking areas in the list of registered tracking areas communicated to the UE. The UE would not send a TAU request when it passed through tracking areas comprising the neighbor tracking area list. This solution, however, greatly increases network resources devoted to paging because the area that the UE can move in without performing a TAU procedure is typically increased from, for example, two to sixteen tracking areas. A UE is typically paged in its last known tracking area; if the UE does not respond, paging may expand to neighbor tracking areas. Thus, if the UE does not respond to paging in the last known tracking area and the UE is using a neighbor list, the MME pages in areas comprising the neighbor list to locate the UE.

SUMMARY

In one implementation, an example method comprises receiving a tracking area identifier indicating a tracking area where a user equipment (UE) is located, and updating a current tracking area of the UE based on whether the tracking area identifier indicates that the UE is currently in a previously visited tracking area.

In another implementation, an example system comprises a mobility management entity for maintaining a registered tracking area list, wherein the MME is configured to update the registered tracking area list based on tracking area updates received from a user equipment that indicate that the user equipment is revisiting a tracking area, and the MME pages the user equipment based on the tracking areas comprising the registered tracking area list.

In a further implementation, a user equipment receives a registered tracking area list comprising tracking areas that the user equipment has previously visited, and performs tracking area update procedures only if entering a tracking area not comprising the registered tracking area list.

DESCRIPTION OF THE DRAWINGS

Features of example implementations of the invention will become apparent from the description, the claims, and the accompanying drawings in which:

DETAILED DESCRIPTION

Figure 1:
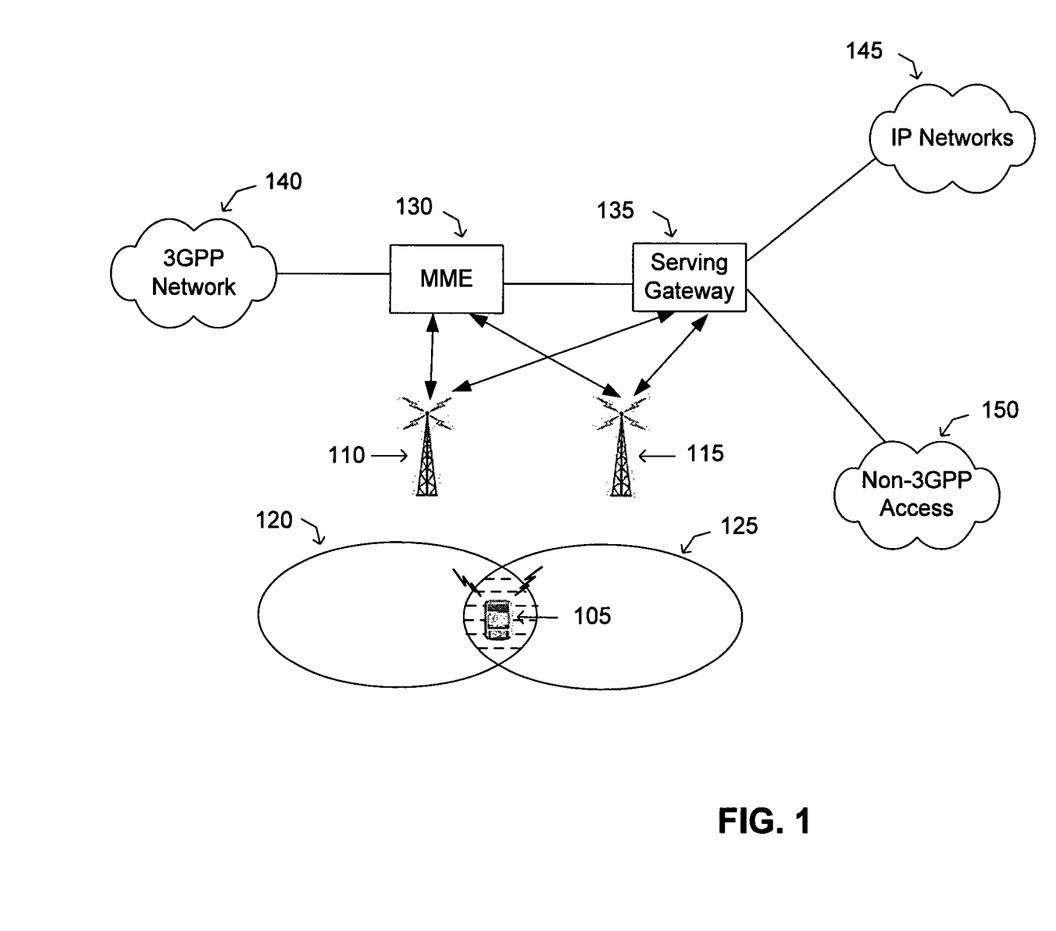
FIG. 1 is a representation of one implementation of an LTE network for performing tracking and paging at tracking area boundaries.

Turning to FIG. 1, which depicts a high level view of an LTE network 100. The network 100 depicted in FIG. 1 is not a-full LTE, but only depicts a few elements of an LTE that may be used during tracking and paging a UE. The network 100 shows a UE 105 that may be in wireless communication with eNBs 110, 115. The network may also comprise one or more tracking areas 120, 125, where each tracking area is associated with one or more eNBs. In the example depicted, eNB 110 may be associated with tracking area 120 and eNB 115 may be associated with tracking area 125. An eNB may be communicatively coupled via a backhaul connection with an MME 130 and a serving gateway (SGW) 135. For example, eNBs 110 and 125 are communicatively coupled with MME 130 and SGW 135. The MME 130 and SGW 135 may be nodes in the network 100 or they 130, 135 may be physical computer components, such as a circuit board, that reside on a computer node in the network 100. The functions of the MME 130 and serving gateway 135 as described herein may be implemented in hardware, firmware or software in combination with associated hardware. The MME 130 may perform UE tracking operations and it may also perform interoperability functionality with 3GPP networks 140. The SGW 135 may act as a mobility anchor during inter eNB handovers, provide interoperability communication with non-3GPP networks 150 and forward user data packets to various IP networks 145.

As the UE 105 moves through the network 100, the UE 105 may perform tracking area update procedures. That is, when the UE 105 detects that it is in a new tracking area, the UE 105 may send a tracking area update (TAU) request to the MME 130 to inform the MME 130 of the UE's 105 new location. As described, tracking area 120 is associated with eNB 110 and tracking area 125 is associated with eNB 115. Because of the described association, if UE 105 is within tracking area 120 and transmits a tracking area update request, eNB 110 may receive the message, and forward the message to the MME 130 and the MME 130 may register the location of the UE 105 as within tracking area 120. Whenever the UE 105 is attached to an LTE network—that is, the UE 105 has successfully registered with the MME 130—the UE 105 transmits a TAU request when the UE 105 detects that it has entered a tracking area where it is not currently registered. Upon receipt of a TAU request, the MME 130 notes the tracking area where the UE 105 has registered. In cases where the UE 105 is at a border of two or more tracking areas, the UE 105 may receive competing signals from eNBs 110 and 115 that make the UE 105 think that it 105 is moving between tracking areas 120 and 125. Accordingly, even though stationary the UE 105 may "ping-pong" or toggles back and forth between the two eNBs 110, 115 and send a flurry of TAU requests to MME 130. This flurry of messages may diminish the computing and communication capacities of eNBs 110, 115 and the MME 130.

As previously mentioned, one solution to "ping-ponging" is to send a pre-configured tracking area neighbor list to the UE 105. A vendor may typically pre-configure the neighbor list with the tracking areas adjacent to the tracking area where the UE 105 registers. For example, when the UE 105 registers its tracking area as tracking area 120, the MME 130 may send a TAU accept message to the UE 105 comprising the pre-configured neighbors list comprising tracking areas that are adjacent to tracking area 120. As the UE 105 moves within tracking areas, the UE 105 consults the neighbor list to determine if the area entered is on the list, and if so, the UE 105 does not does not register its position within the new tracking area. This may work in circumstances when the number of tracking area adjacent to a given area is small, but the list may contain as many as sixteen entries. Also, there may be times when the UE 105 registers in the tracking area 120, but does not have a "ping-pong" problem. Nevertheless, the UE 105 receives the full pre-configured neighbors list that is stored on the MME 130. When the MME 130 pages the UE 105, the MME 130 first pages in a narrow area, such as the last know registered tracking area, and eventually expands the paging to include neighbors of the last known tracking area. If, however, the UE 105 receives a pre-configured neighbor list comprising sixteen tracking areas, the UE 105 may move, for example, into the sixteenth tracking area without updating its 105 location. Then, when the MME 130 tries to page the UE 105, the MME 130 (which also stored the pre-configured neighbor list) may have to page sixteen tracking areas in order to locate the UE 105. This extra effort needed to locate the UE 105 may strain paging resources of the MME 130 and the eNBs 110, 115. Thus, there is a tradeoff based on the size of the neighbor list. If the list is smaller, paging may be easier, but a UE may exhibit toggling in areas that are not on the list. If the list is larger, paging a UE may place a strain on paging resources, but the UE is less likely to exhibit "ping-pong" behavior, and thus the system is less likely to be overburdened with TAU requests.

Tracking the cyclical movement of a UE between tracking areas is one way to alleviate the problems associated with "ping-ponging" and also not overburden resources associated with paging a UE. If, for example the UE 105 were to perform TAU registration in tracking area 120, and then register in tracking area 125 and again register in tracking area 120, it would be apparent that the UE 105 is cycling between these two tracking areas 120, 125 and thus a registered tracking area list for the UE should include tracking areas 120 and 125. The registered tracking area list, however, should not include any of the other tracking areas comprising the pre-configured neighbor list that the UE 105 has not visited. The registered tracking area list comprising the tracking areas the UE 105 is cycling through should be communicated to the UE 105 so that the UE 105 knows not to send a tracking area update to the MME 130 when the UE 105 detects that it has entered into one of the tracking areas it is cycling through. The cycle, however, may be broken when the UE 105 enters a tracking area that the UE 105 is not currently cycling through, that is, a tracking area not currently on the registered tracking area list. This is one example of how the cycle may be broken, other examples are described below. When the cycle is broken, the registered tracking area list may be initialized and filled with only the last seen tracking area. Herein, initializing a list may include clearing the list, in other words, removing any entries currently comprising the list. At this point, the MME 130 may continue looking for cyclical movement between tracking areas and update the registered tracking area list accordingly.

Turning now to FIGS. 2a-e, which depict a last seen tracking area (LSTA) list 200 and a registered tracking area (RTA) list 202 that may reside on an MME, the sequence of figures shows how these lists 200, 202 are updated as a UE moves through three tracking areas 230 of an LTE network. In this example the LSTA list 200 comprises three entries 210a, 210b, 210c that contain a tracking area identifier (TAI). The RTA list 202 may also comprise three entries 220a, 220b, 220c that contain a TAI. The initials "N/A" indicate that there is no TAI currently in a particular entry. The MME may update the lists 200, 202 as a UE moves through tracking areas. The LSTA may comprise the TAIs in which the UE has registered. The RTA list may comprise the last known TAI and identifiers of the tracking areas the UE has previously visited or, in other words, where cyclic UE movement is observed. FIGS. 2a-e also illustratively includes a UE 225 and three tracking areas: tracking areas A, B, and C 230. The UE 225 may be communicatively coupled with an MME (not pictured) via an eNB (not pictured).

Figure 2A:
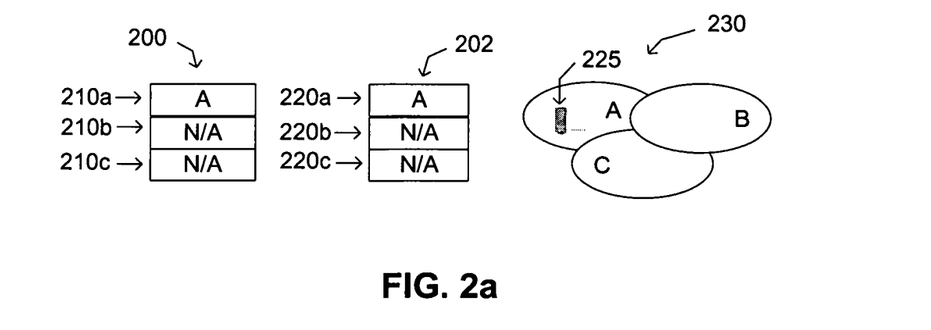
FIGS. 2*a-e* are a representation of how a last seen tracking area list and a registered tracking area list are updated as a UE moves through three tracking areas.

FIG. 2a shows the UE 225 present in tracking area A. Assuming that the UE 225 is attached to the network, the UE 225 communicates a TAU request to the MME when the UE enters tracking area A. After receipt of the TAU request, the MME may update the LSTA list 200 with TAI "A" in the first entry 210a of the list 200. The MME may also update the RTA list 202 with TAI "A" in the first entry 220a of the RTA list 202, and send the RTA list 202 to the UE 225 in a TAU accept message. The UE 225 typically maintains a copy of the RTA list 202 and consults the list to determine if the UE 225 is entering a tracking area where the UE 225 is not registered. If the UE 225 is entering a tracking area where it 225 is not registered, the UE 225 sends a TAU request to the MME to inform the MME of its 225 new tracking area location.

Figure 2B:
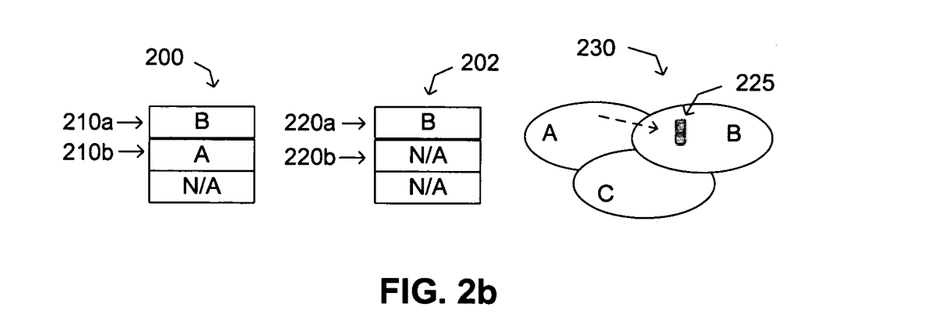

As shown in FIG. 2b by the illustrated arrow, the UE 225 travels to tracking area B. The UE 225 consults its RTA list 202 to determine that that the UE 225 is entering a tracking area where the UE 225 is not currently registered and accordingly, the UE 225 sends a TAU request to the MME. After receipt of the TAU request the MME determines that TAI "B" is not currently in the LSTA list 200. Because the new tracking area, TAI "B", is not currently in the LSTA list 200, it is determined that the UE 225 is not engaging in cyclic movement, that is, the UE 225 is not visiting a tracking area it has previously visited. The MME adds the new TAI "B" to the LSTA list by pushing the TAI comprising the first entry 210a to the second entry 210b, and adding the new TAI to the first entry 210a in the LSTA list 200. Thus, the MME adds entries to the LSTA list 200 as if the LSTA list 200 were a push down stack. Thus, by looking at the LSTA list 200 from top to bottom, one may determine the chronological order of the tracking areas the UE 225 visited starting with the most recently visited area at the top of the list and the oldest visited area at the bottom of the list. Accordingly, TAI "B" is in the first entry 210a and TAI "A" is in the second entry 210b. Note that although a known chronological ordering of entries in the list must be adhered to, the specific chronological ordering from top to bottom with most recent on top is not critical. For instance, the list may be order with the most recent entry in the bottom position. Note further that although illustrated for ease of understanding as a list of adjacent memory positions, the memory for storing list entries need not be so co-located. Also, because the UE 225 is not engaging in cyclic movement between tracking areas, RTA list 202 is cleared and the TAI "B" is pushed onto the top of the RTA list 202. The RTA list 202 is then communicated to the UE 225.

Figure 2C:
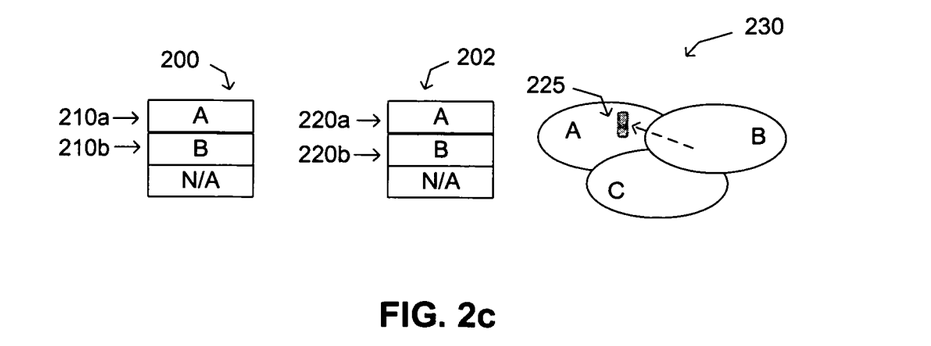

FIG. 2c depicts the UE 225 moving back to tracking area A. Again, the UE 225 consults its RTA list 200 to determine that the UE 225 is entering a tracking area where the UE 225 is not currently registered, and accordingly, the UE 225 sends a TAU request to the MME. After receipt of the TAU request, the MME determines that tracking area A is a TAI that is currently in the LSTA list 200. The already present TAI "A" is an indication that the UE 225 has cycled back to an area previously visited. Also, because the MME maintains the order of the identity of the tracking areas that the UE 225 has visited, the MME clears the previously entered TAI "A" from the second entry 210b and pushes the TAI "A" onto the top of the LSTA list 200 so that the LSTA list 200 now comprises TAI "A" in the first entry 210a and TAI "B" in the second entry 210B. Further, because the MME has detected that the UE 225 is cycling between two tracking areas, the MME pushes the TAI of the new tracking area onto the RTA list 202 so that the RTA list 202 now comprises the TAI "A" in the first entry 220a and TAI "B" in the second entry 220b. The MME communicates the RTA list 202 comprising TAIs "A" and "B" to the UE 225. Because the RTA list 202 of the UE 225 now comprises TAIs "A" and "B", the UE 225 recognizes that the new tracking area (tracking area A) is now in its RTA list, and thus the UE 225 will not send a TAU request message to the MME if the UE 225 toggles between tracking areas A and B.

Figure 2D:
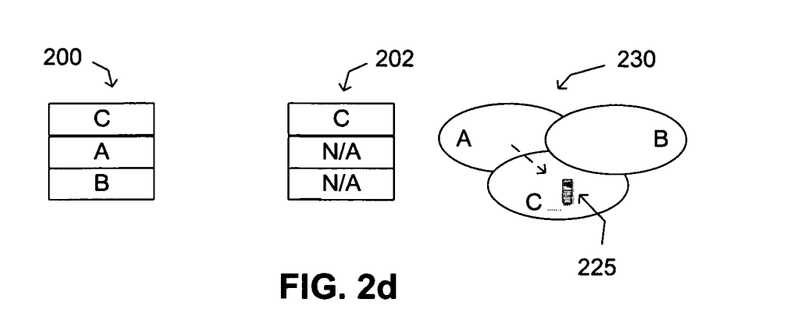

FIG. 2d depicts the UE 225 moving from tracking area A to tracking area C. After entering the new tracking area, the UE 225 consults its RTA list 202 to determine that the UE 225 is entering a tracking area where the UE 225 is not registered and accordingly, the UE 225 sends a TAU request to the MME. After receipt of the TAU request, the MME determines that TAI "C" is not in the LSTA list 200. Thus, it is determined that the UE 225 is not engaging in cyclical movement. The MME pushes the new tracking area identifier onto the LSTA list 200 so that the LSTA list 200 comprises TAIs "C", "A", and "B" as shown in FIG. 2d. Because the UE 225 has broken the cycle of movement between tracking areas "A" and "B", RTA list 202 is cleared and the TAI "C" is pushed onto the top of the RTA list 202. The RTA list 202 is then communicated to the UE 225 in a TAU accept message.

Figure 2E:
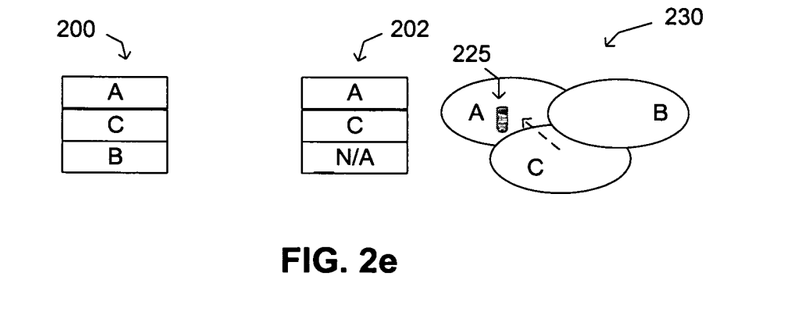

FIG. 2e depicts the UE 225 traveling back to tracking area A. The UE 225 consults its RTA list 202 to determine if the UE 225 is entering a tracking area where it 225 is not registered. Because TAI "A" is not in the RTA list 202, the UE 225 is not entering a tracking area where it is currently registered, and thus the UE 225 communicates a TAU request to the MME. Upon receipt of the TAU request the MME sees that TAI "A" is already in the LSTA list 200, and thus the UE 225 is cycling back to an area that it 225 previously visited. Because TAI "A" is already in the LSTA list 200, the MME pushes TAI "A" onto the top of the LSTA list 200 and removes the duplicate instance of the TAI "A" from the middle of list 200. Thus, LSTA list 200 now comprises TAIs "A", "C" and "B" in the order shown in FIG. 2e. Also, because the UE 225 engaged in cyclic movement when it moved into tracking area "A", TAI "A" is pushed onto RTA list 202 so that the RTA list 202 now comprises TAIs "A" and "C." The RTA list 202 is now communicated to the UE 225 where the UE 225 stores its 225 own copy of the RTA list 202.

Although the LSTA list 200 and the RTA list 202 depicted in FIGS. 2a-e comprise three entries, the LSTA list 200 and the RTA list 202 may comprise as many entries as supported by a TAU accept message, for example, 16 entries. Further, although the LSTA 200 list and the RTA list 202 were depicted as having the same number of entries, an operator may configure the lists 200, 202 to have the same or a different number of entries, where either list 200, 202 may have more or fewer entries than the other. For example, the LSTA list 200 may be comprised of five entries and the RTA list 202 may be comprised of three entries. Thus, although movement of the UE may be tracked between five tracking areas, the operator may want to only have three entries configured as registered tracking areas.

Figure 3A:
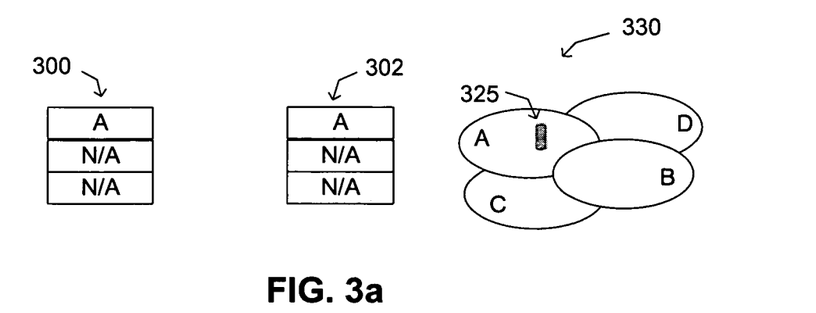
FIGS. 3*a-e* are a representation of how a last seen tracking area list and a registered tracking area list are updated as a UE moves through four tracking areas.

Turning now to FIGS. 3a-e, which depict an LSTA list 300, and an RTA list 302 that may reside on an MME, this sequence of Figures shows how these lists 300, 302 are updated as a UE 325 moves through four tracking areas 330 comprised of tracking area A, B, C and D. As shown in FIG. 3a, the UE 325 is located in tracking area A where it has previously attached. The UE 325 may then send a TAU request comprising TAI "A" to an MME serving the tracking areas 330. After receiving the TAU request, the MME may determine that TAI "A" is not in the LSTA list 300 and thus the UE 325 is not visiting a tracking area visited previously, that is, the UE 325 is not cyclically moving among the tracking areas 330. Accordingly, the MME pushes TAI "A" onto the LSTA list 320 and RTA list 302, and communicates the RTA list 302 to the UE 325 where the UE 325 maintains a copy of the RTA list 302.

Figure 3B:
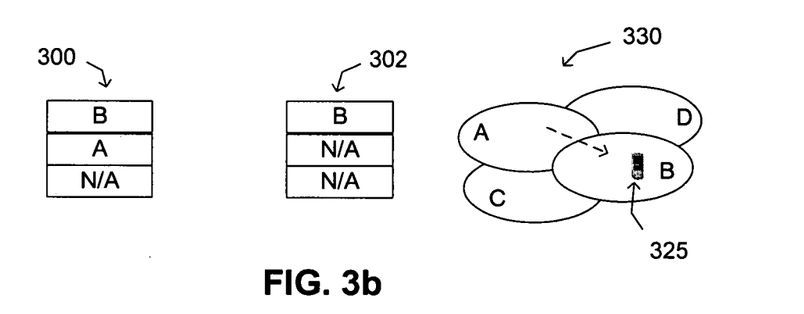

FIG. 3b depicts the UE 325 moving from tracking area A to tracking area B. After entering tracking area B, the UE 325 consults its copy of the RTA list 302 to determine if the UE 325 is cycling back to tracking area B. Because the RTA list 302 does not include the TAI "B," the UE 325 knows that it 325 is not returning to this tracking area and thus, the UE 325 communicates a TAU request comprising the TAI "B" to the MME. After receiving the TAU request, the MME may determine that TAI "B" is not in the LSTA list 300 and thus, that the UE 325 is not cycling back to tracking area B. Accordingly, the MME pushes TAI "B" onto the top of the LSTA list 300. Because the UE 325 is not cycling between tracking areas, the MME clears the RTA list 302 and pushes the new TAI "B" onto the RTA list 302 and communicates the RTA list 302 to the UE 325.

Figure 3C:
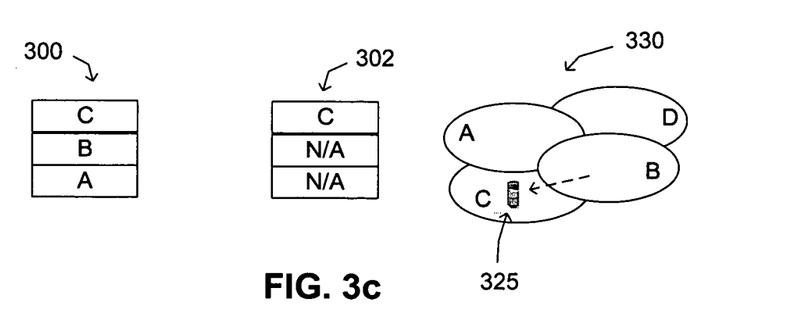

FIG. 3c shows the UE 325 moving from tracking area B to tracking area C. After entering tracking area C, the UE 325 consults its copy of the RTA list 302 to determine if the UE 325 is cycling back to this tracking area. Because the RTA list 302 does not comprise the TAI "C," the UE 325 knows that it is not returning to tracking area C and thus the UE 325 communicates a TAU request comprising the TAI "C" to the MME. After receiving the TAU request, the MME may determine that the TAI "C" is not in the LSTA list 300 and thus, that the UE 325 is not cycling back to tracking area C. Accordingly, the MME pushes TAI "C" onto the LSTA list 300. As shown in FIG. 3C, the LSTA list 300 now comprises TAIs "C", "B" and "A". Because the UE 325 is not cycling between tracking areas, the MME clears the RTA list 302 and pushes the new TAI "C" onto the RTA list 302 and communicates the RTA list 302 to the UE 325.

Figure 3D:
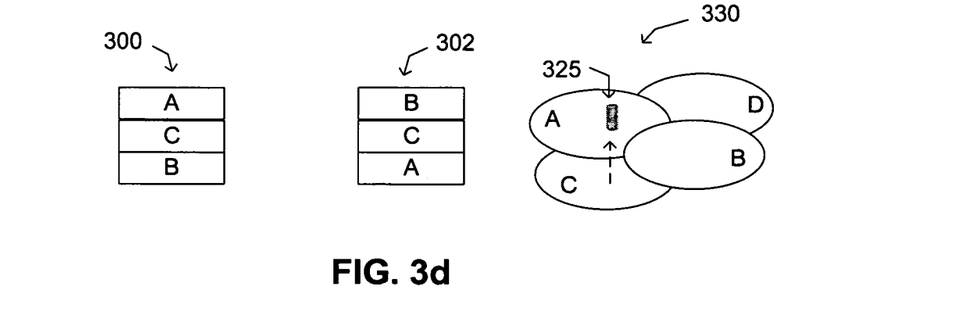

FIG. 3d depicts the UE 325 moving back into tracking area A from tracking area C. After entering tracking area A, the UE 325 consults its copy of the RTA list 302 to determine if TAI A is in the RTA list 302. Because the RTA list 302 of the UE 325 currently includes only TAI "C", the UE 325 is not returning to a registered tracking area and thus, the UE 325 communicates a TAU request comprising tracking area "A" to the MME. After receiving the TAU request, the MME determines that the TAI "A" is in the LSTA list 300 and thus, that the UE 325 is cycling back into a previously visited tracking area. Because the previously visited tracking areas were pushed onto the LSTA list in chronological order, the MME may traverse the list 300 from top to bottom to determine the tracking areas where the UE 325 previously registered. All the entries encountered before a matching entry is found are tracking areas where the UE 325 previously registered before entering the current tracking area, and thus these areas may be the tracking areas the UE 325 is "ping-ponging" between. For example, after receiving the TAU request, the LSTA list 300 may be in a state shown in FIG. 3C, thus the LSTA list 300 is comprised of the TAIs "C", "B" and "A". Traversing down through the list one encounters TAIs "C" and "B" before encountering TAI "A". Thus the UE 325 registered in tracking areas C and B before returning to tracking area A. Therefore, the LSTA list 300 is updated by removing the already existing TAI "A" at the bottom of the list in FIG. 3c, and pushing the newly seen TAI "A" on top of the LSTA list 300 to arrive at the LSTA list 300 shown in FIG. 3d. Further, the RTA list 302 is updated to reflect that the UE 325 has previously visited, or "ping-ponged" between the tracking areas B, C and A. Thus, the TAIs "B", "C" and "A" are pushed on the RTA list 302 to arrive at the RTA list 302 depicted in FIG. 3D. The MME communicates the RTA list 302 of FIG. 3d to the UE 325 via a TAU accept message.

Figure 3E:
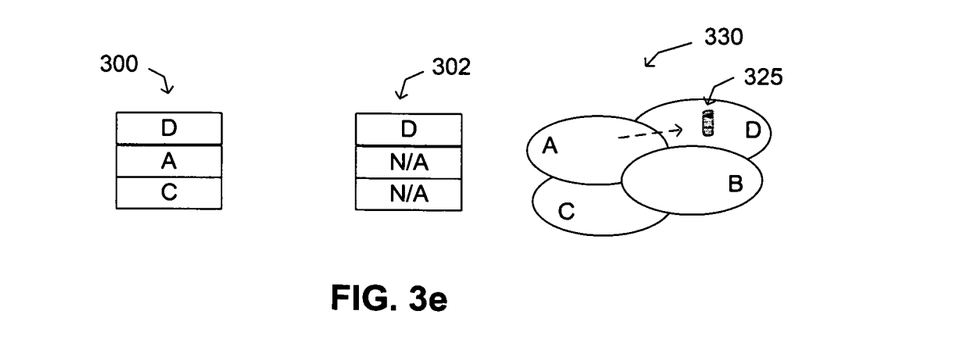

FIG. 3e depicts the UE 325 moving from tracking area A to tracking area D. After entering tracking area D, the UE 325 consults its copy of the RTA list 302 to determine if the UE 325 is entering a tracking area where it 325 is registered. Because the RTA list 302 does not include TAI "D", the UE 325 knows that it 325 is not returning to a registered tracking area, and thus the UE 325 communicates a TAU request comprising TAI "D" to the MME. After receiving the TAU request, the MME may determine that TAI "D" is not in the LSTA list 300 and thus the UE 325 is not revisiting tracking area D. Accordingly, the MME pushes the new TAI "D" onto the top of the LSTA list 300 as shown in FIG. 3e. Because the UE 325 is now in a new tracking area that is not in the LSTA 300, any cycle the UE 325 may have previously been involved in is now broken and thus, the RTA list 302 is cleared and the newly entered TAI "D" is pushed on the top of the RTA list 302 as shown in FIG. 3e.

In an LTE network, an MME may include a T3412 timer value in a TAU accept sent to a UE. The UE uses the timer value as a measure for when the UE should report its location to the network. The UE sets a timer for the length of the T3412 timer value and if the timer expires, the UE sends a TAU request to report its location to the MME. If, however, the UE detects that it has changed tracking areas while the timer is unexpired, the UE should cancel the T3412 timer and send a TAU request to report its newly detected location. If the UE subsequently receives a TAU accept comprising a T3412 timer value, the UE uses this value to start another T3412 timer. If the UE is moving within a manually configured neighbor list comprising a number of registered tracking areas, the T3412 timer forces the UE to report its location within a certain time regardless of whether the UE is still located within the registered tracking areas. Thus, the UE may be paged more efficiently because the location of the UE should be more accurately maintained.

If the UE is engaging in rapid toggling between multiple tracking areas, the value of this timer may be set to a shorter value than the standard T3412 timer. Thus, in standard circumstances the timer may be set to, for example, one hour; but may be set to, for example, five minutes, when the UE is toggling between multiple tracking areas. When the UE is toggling between multiple tracking areas, the UE may have a registered tracking area list comprising a number of tracking areas. Thus, when the MME pages the UE, if the MME has to broaden its paging area to reach the UE, the MME may have to page in all tracking areas comprising the registered tracking list. The shortened T3412 timer forces the UE to update its tracking area more quickly, and thus the MME has a more accurate location of the UE. Further, the TAU request may contain an indication that the T3412 timer has expired. After receiving such a TAU request from the UE, the MME may clear an RTA list associated with the UE and restart detection of UE cyclical movement. The shortened T3412 timer allows the MME to more effectively detect when a UE has stopped toggling between adjacent tracking areas and the UE can update the RTA list to improve paging efficiency.

When a UE is in a part of a network that allows the UE to receive tracking signals from more than one eNB, the UE typically "ping-pongs" or toggles between eNBs in a fairly rapid fashion. There may be times, however, when a UE exhibits cyclic movement but is not toggling between eNBs. For example, a person may attach to the network in a first tracking area upon powering up his/her UE at home. He/she may then travel into a second tracking area while dropping his/her child off at school and then return home. This would appear to an MME as cyclical movement because the UE is returning to a tracking area where it previously registered. The UE, however, is simply traveling between tracking areas rather than toggling between neighboring eNBs. One way to distinguish between cyclical travel and toggling between tracking areas would be to time the interval between times the UE indicates that it is moving into new tracking areas. This may be done by timing the interval between when the MME receives TAU request messages. Based on the length of the interval between TAU requests, a determination can be made whether the cyclic movement exhibited is "ping-ponging" or merely regular travel between tracking areas.

Turning now to FIGS. 4a-e, this sequence of figures illustrate determining an interval between TAU requests for a UE 425 moving through tracking three tracking areas 430. As the UE 425 moves through the tracking areas, an MME (not pictured) may note times when the MME receives TAU request messages from the UE 425. The MME may determine a cycle time interval between tracking area updates as the UE 425 moves among the tracking areas 430. If the cycle time interval exceeds a time threshold or cycle time threshold, the UE 425 may be performing normal tracking area updates as part of regular travel. If the cycle time interval is equal or below the cycle time threshold, the UE 425 may be "ping-ponging" between one or more eNBs.

Figure 4A:
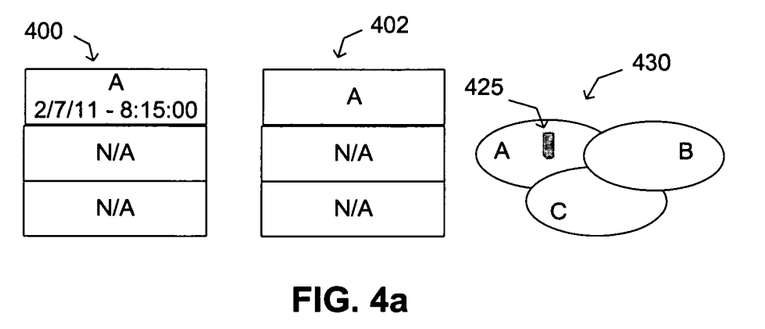
FIGS. 4*a-e* are a representation of a how a tracking area list may be updated with a time stamp, and how a registered tracking area list and associated timer may be updated as a UE updates its location.

Turning now to FIG. 4a, UE 425 present in tracking area A is illustrated. Assuming that the UE 425 is attached to the network, the UE 425 sends a TAU request to the MME after entering tracking area A. After receipt of the TAU request, the MME updates the LSTA list 400 by pushing the TAI "A" on top of the list 400. The MME may also associate a time stamp with the newly entered tracking area. Thus, as shown in FIG. 2A, the time "08:15:00" and date "2/7/11" is associated with the entry corresponding with TAI "A". Further, an RTA list 402 is updated with TAI "A". The updated RTA list 402 including the TAI "A" and a T3412 timer value may be sent to the UE 425 in a TAU accept message. At this point, there is no cycle time interval because the UE 425 has only visited one tracking area so far, and thus has not cycled back to a previously visited tracking area. Because there is no cycle time interval, the cycle time interval may not be below the cycle time threshold. Consequently, the MME may set the T3412 timer to a first longer value, such as, one hour. Other values for this first longer timer value may be utilized.

Figure 4B:
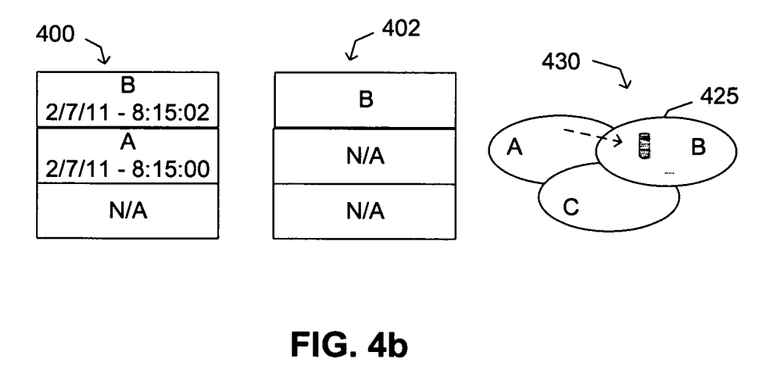

FIG. 4b depicts the UE 425 moving from tracking area A to tracking area B. Because TAI "B" is not in the RTA list of the UE 425, the UE 425 sends a TAU request message to the MME. The MME pushes the new TAI "B" on top of the LSTA list 400 and enters a corresponding date and time that the TAU request was received. The MME also updates the RTA list 402 with TAI "B", and sends the RTA list 402 to the UE 425 in a TAU accept message. Again, the UE 425 has not cycled back to a previously visited tracking area, so there is no cycle time interval, and thus the T3412 timer may be set to a first longer value such as one hour.

Figure 4C:
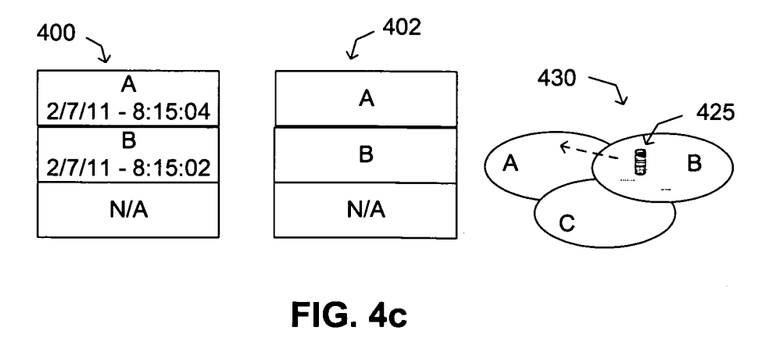

As shown in FIG. 4c, the UE 425 moves from tracking area B back into tracking area A. After the UE 425 moves back into tracking area A, the UE 425 sends a TAU request message to the MME and the MME takes a timestamp of when the TAU request was received. Thus, the timestamp reflects when the UE 425 moved back into tracking area A. The date and time of the timestamp is shown as "2/7/11 08:15:04." The MME may push the TAI "A" onto the LSTA list 400. The TAI "A" is already in the LSTA list 400 (See FIG. 4b), and thus the MME knows that that UE 425 is cycling back to tracking area A. Because the UE 425 is cycling between tracking areas A and B, the MME may compare the time the UE 425 first entered tracking area A and the time the UE 425 returned. As can be seen from comparing the times associated with TAI "A" in FIGS. 4a and 4c, the UE 425 cycled back to tracking area A in four seconds. Because the cycle time interval of the UE 425 (four seconds in this example) is less than or equal to the cycle time threshold (an exemplary two minutes in this example), it is determined that the UE 425 may be toggling between tracking areas. Thus, the MME updates the RTA list 402 to include TAI "A". The MME also sends the RTA list 402 comprising TAIs "A" and "B" and a second shortened T3412 timer value, for example fifteen minutes, in a TAU accept to the UE 425. Other values may be utilized for this second shortened timer value.

Figure 4D:
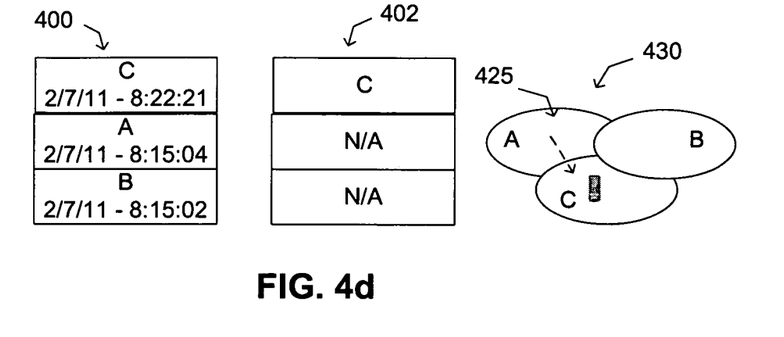

FIG. 4d depicts the UE 425 moving into tracking area C. Because TAI "C" is not in the RTA list of the UE, the UE 425 sends a TAU request message to the MME. The MME pushes the new TAI "C" on top of the LSTA list 400 and enters a corresponding date and time that the TAU request was received. Because cyclic movement between tracking areas A and B is broken, the MME clears the RTA list 402 and pushes TAI "C" on top of the list 402. The RTA list 402 and the T3412 timer are sent to the UE 425. The T3412 timer may be set to a third higher value, such as one hour, because the UE 425 is no longer engaged in cyclic movement.

Figure 4E:
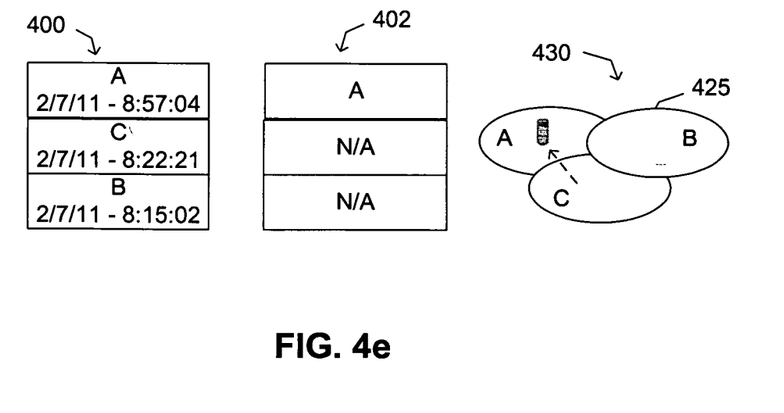

As shown in FIG. 4e, the UE 425 has moved back into tracking area A. Because TAI "A" is not in the RTA list of the UE 425, the UE 425 sends a TAU request message to the MME. The MME notes the date and time the TAU request message was received, "2/7/11 8:57:37". The MME also finds TAI "A" in the LSTA list 400. Because the TAI "A" is in the second entry of the list and TAI "C" is in the first entry before the MME updates the list 400 (see FIG. 4d for the state of the list 400 before updating by the MME), the UE 425 determines that the UE 425 is cycling back into tracking area A from tracking area C. Because the UE 425 first moved into tracking area A at 8:15:04 (see FIG. 4d) and then moved back into tracking area A 42 minutes later at 8:57:04 (see FIG. 4E), the cycle time interval is 42 minutes. If, for example, the cycle time threshold is two minutes, the cycle time interval—which is 42 minutes in this case—is greater than the cycle time threshold. Therefore, it is determined that the UE 425 is not engaging in "ping-ponging" between tracking area A and tracking area C; instead, it is determined that the UE 425 may be engaging in normal travel between these two tracking areas. Because the UE 425 is engaging in normal travel between tracking area A and C, the MME clears the RTA list 402 and pushes the tracking area A on top of the list 402. Also, because the UE is not engaging in toggling between tracking areas A and C, the MME sets the T3412 timer to a longer value, such as, one hour. The MME may then communicate the RTA list 402 and the T3412 timer to the UE 425 in a tracking area update accept message.

Figure 5:
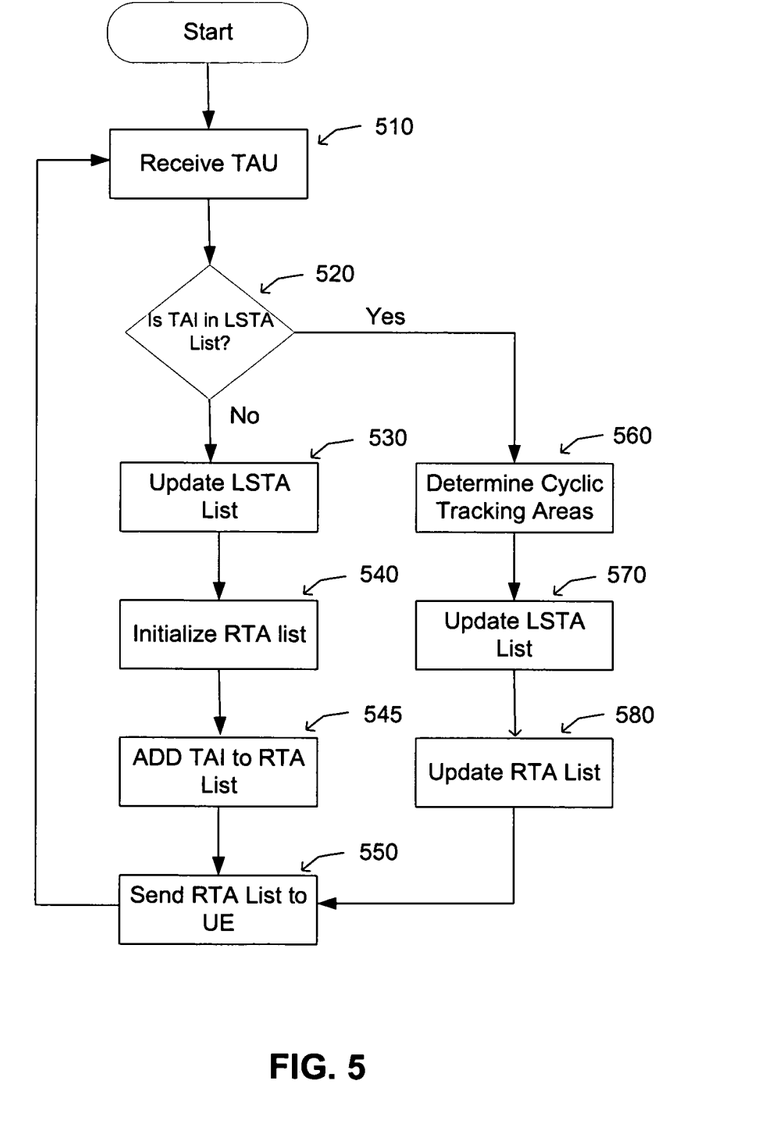
FIG. 5 is one example of a flow diagram that may represent a method for UE tracking at boundaries in an LTE network.

Turning now to FIG. 5, an example flow diagram illustrating a method for tracking a UE at boundaries in an LTE network is shown. The method may be executed in an MME, a circuit board or a computer hardware node that resides in an LTE network. At 510 a TAU message comprising a TAI is received from the UE. In one example, the TAU message is received at an MME that comprises an LSTA list and RTA list. At 520, it is determined whether the received TAI is in the LSTA list. If the received TAI is not in the LSTA list, the received TAI is pushed onto the top of the LSTA list 530, the RTA list is initialized 540, the received TAI is added to the RTA list 545, and the RTA list is sent to the UE 550.

At 520, when it is determined that the received TAI is in the LSTA, the UE may be visiting a tracking area that it previously visited. That is, the UE may be engaging in cyclic movement. If the UE is engaging in cyclic movement, it may be determined which tracking areas the UE visited during the cyclic movement 560. This determination may be made in the same manner as described in relation to FIG. 3d. In other words, a determination of tracking areas the UE previously visited may be made by traversing the LSTA list from top to bottom. All entries encountered in the LSTA list before an entry matching the received TAI are tracking areas the UE may be cycling through. At 570, the LSTA list may be updated with the received TAI by removing the received TAI from the LSTA list and pushing the received TAI on top of the LSTA list. Because the UE is engaging in cyclic movement, the RTA list may be updated by pushing the received TAI on top of the RTA list 580. The RTA list may be communicated to the UE 550.

Figure 6A:
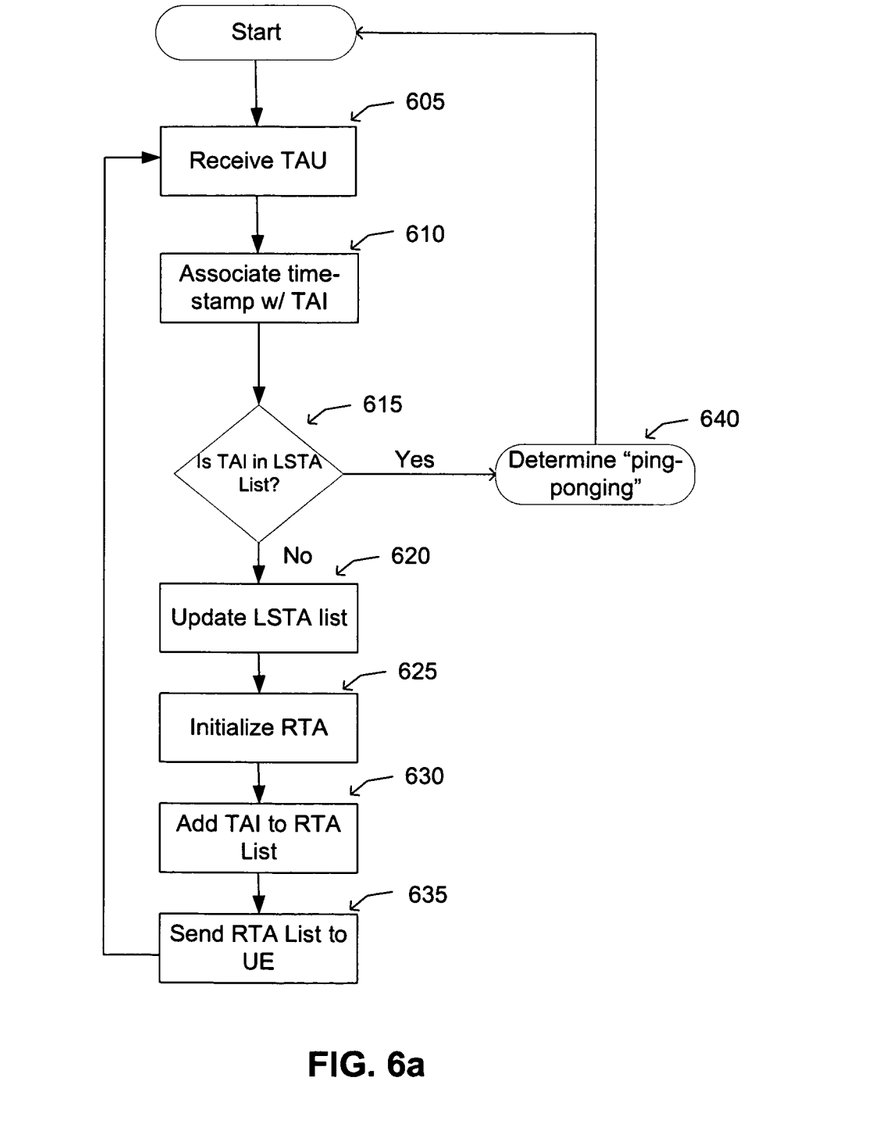
FIGS. 6*a-b* is one example of a flow diagram that may represent a method for UE tracking at boundaries in an LTE network using timers to further identify "ping-ponging".

Turning now to FIG. 6a, an example flow chart diagram that may represent a method for tracking a UE at boundaries in an LTE network using timers to further identify cyclic movement that is characterized as "ping-ponging" is depicted. The method may be implemented in an MME, a circuit board or a computer node that resides in an LTE network. At 605 a TAU message comprising a TAI is received from the UE. In one example, the TAU message is received at an MME that comprises an LSTA list and an RTA list. A time-stamp may be associated with the received TAI 610. At 615, it is determined whether the received TAI is in the LSTA list. If the received TAI is not in the LSTA list, the received TAI and its associated time-stamp are pushed onto the top of the LSTA list 620, the RTA list is initialized 625, the received TAI is added to the RTA list 630, and the RTA list is sent to the UE 635.

At 615 when it is determined that the LSTA list comprises a TAI that matched the received TAI, the UE may be visiting a tracking area that it previously visited. That is, the UE may be engaging in cyclic movement. If the UE is engaged in cyclic movement, the time-stamp associated with the received TAI may be used to further determine if the UE is "ping-ponging" between tracking areas 640.

Figure 6B:
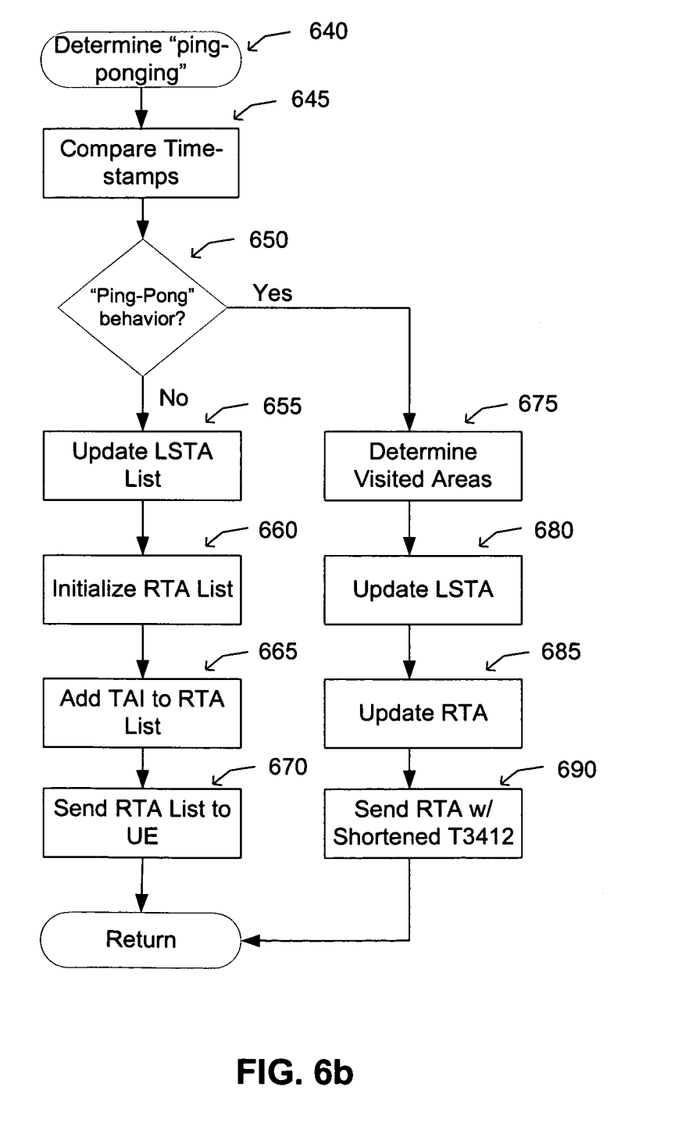

Turning now to FIG. 6b, at 645 the time-stamp associated with the received TAI may be compared to the time-stamp associated with the matching TAI of the LSTA list. The difference between these two time-stamps may be a cycle-time interval. At 650, it is determined if the cycle-time interval exceeds a cycle-time threshold. If the cycle-time interval exceeds the cycle time threshold, the UE may be engaging in regular travel between tracking areas and thus the UE is not "ping-ponging" between tracking areas. Accordingly, the LSTA list is updated 655. Updating the LSTA list may include removing the matching TAI and pushing the received TAI onto the LSTA list. The RTA list may be initialized 660, the received TAI may be added to the RTA list 665, and the RTA list may be communicated to the UE 670.

At 650, when the UE is "ping-ponging" between tracking areas, it is determined which tracking areas the UE previously visited 675, and thus the tracking areas the UE is "ping-ponging" between. This determination may be made in the same manner as described in relation to FIG. 3d. In other words, a determination of tracking areas the UE previously visited may be made by traversing the LSTA list from top to bottom. All entries encountered in the LSTA list before an entry matching the received TAI are tracking areas the UE may be "ping-ponging" between. At 680, the LSTA list may be updated with the received TAI by removing the matching TAI and pushing the received TAI along with its associated time-stamp on top of the LSTA list. Because the UE is "ping-ponging" between tracking areas, the RTA list may be updated by pushing the received TAI on top of the RTA list 685. The RTA list along with a shortened T3412 timer may be communicated to the UE 690.

Although a UE may be engaging in cyclical movement among tracking areas, there may be instances when the MME may not want to update or may want to clear either the LSTA list or the RTA list. For example, when the MME receives a TAU request indicating that a T3412 timer expiration occurred, the MME may want to clear the RTA list and start with the last received TAI while maintaining the LSTA list without clearing it. Other instances when the LSTA and RTA may be cleared and/or the MME may forgo updating one or other of the lists include when: the UE first attaches, the UE is connected, an inter-MME handover occurs, circuit switch fall-back and inter-SGW handover (or serving gateway relocation) occur. For example, the last seen tracking area list and the registered tracking area list may be initialized when the MME receives: an attach request, an indication of a switch of serving gateway, or an indication of an inter-MME handover. In another example, the registered tracking area list may be cleared and the registered tracking area list may be updated with a received tracking area identifier when the MME receives: a tracking area updated resulting from the expiration of a T3412 timer, an indication of an inter-MME handover, or an indication of a serving gateway relocation.

If the UE is in a connected state (that is; if the UE is currently in a voice or data call), the location of the UE is definitely known. Thus, if the MME receives a TAU request while the UE is connected, the MME will perform regular updates on the LSTA list, but the MME will update the RTA list with only the last received TAI. Thus, the MME does not monitor cyclic movement while the UE is connected, but the UE will continue to maintain the LSTA list and update the RTA list with tracking areas received while the UE is connected. If, however, the UE engages in either an inter-MME or inter-SGW handover, the tracking information for the UE starts again from an initialized state. Thus, if an inter-MME handover occurs, a new MME begins serving the UE and thus does not have any tracking information about the UE. After the MME switch occurs, the UE reports its location to the target/new MME with a TAU request. The new MME may populate the LSTA and RTA with a TAI received in a TAU request. Also, if the UE switches SGWs, the MME may clear the LSTA and RTA lists associated with the UE. After the UE switches SGWs, it typically reports its location through a TAU request. At that time, the MME may populate the LSTA and RTA list with the TAI comprising the TAU request.

Minimizing tracking area updates at boundaries in LTE networks may be configured as a system wide feature that a service provider may turn-on or turn-off based on changing system conditions. As previously explained, the way an RTA list is maintained may affect paging. Thus, depending on the circumstances, a service provider may want to turn on the feature if too many TAU requests are flooding the network and thus hindering the successful processing of TAU requests. On the other hand, if paging resources are currently being strained, a network operator may want to turn off the feature in an attempt to help alleviate paging congestion.

Similarly, different aspects of the feature may be configured based on network conditions. For example, if too many TAU requests are overloading the system, the size of the LSTA and RTA lists may be increased. Although in the embodiments depicted the size of these lists has been limited to three entries, in other embodiments these lists may exceed or be less than three entries. On the other hand, if paging resources are currently strained, the network operator may decrease the size of the LSTA and RTA lists to two entries so that a location of a UE may be more accurately known. Although in the embodiments presented the LSTA and RTA lists comprised the same number of entries, in other embodiments the LSTA and RTA lists may comprise a different number of entries. For example, the LSTA list may support four entries and the RTA list may support three, or vice-versa.

As previously explained, how tracking area updating is performed may affect paging performance. Also as explained, a service provider may manually configure a list of neighbor tracking areas for a given tracking area. Thus, if a UE moves into a tracking area that has an associated preconfigured neighbor list, the MME may send the neighbor list to the UE when the UE updates its location. The UE does not update its location as it moves within the tracking area comprising the neighbor list. Thus, when the MME pages the UE, the UE may be in any of the tracking areas comprising the neighbor list.

In some embodiments, the preconfigured neighbor list, the RTA and the LSTA lists may be used in conjunction with each other when paging a UE. For example, an MME may go through an expanding sequence of geographical areas when paging the UE. Thus the MME may first page a last known tracking area, and then page the tracking areas comprising the RTA and/or the LSTA list(s), followed by paging the tracking areas comprising the neighbor list. Or, the MME may page the neighbor list before trying to page the UE in areas of the RTA and/or LSTA list(s).

In other embodiments, when going through the expanding sequence of geographical areas, the MME may page only tracking areas from the various lists in a mutually exclusive manner. For example, suppose the neighbor list comprises tracking areas 1 and 2, the RTA comprises tracking areas 2 and 3, and the LSTA is comprised of tracking areas 2, 3 and 4. If the MME pages the neighbor list, the RTA list and the LSTA list in that order, the UE may page tracking areas 1 and 2 first. The MME may then page tracking area 3 because tracking area 3 is on the RTA list, but not on the neighbor list. Finally, the MME may page tracking area 4, because tracking area 4 does not appear on either the neighbor list or the RTA list. Although in this example paging occurred based on the neighbor list being first, the RTA list being second and the LSTA list being third, a UE may be paged based on these lists with the lists paged in any order.

In still another embodiment, the MME may use the neighbor list exclusively for paging, but use the RTA list for UE location tracking. In other embodiments, the RTA list may be used for paging and the neighbor list may be used for UE location tracking. In still another embodiment, the MME may page tracking areas based on a chronological appearance of a UE in a tracking area. Recall that the LSTA list and RTA list comprise TAIs in a chronological order that the UE appeared in a tracking area—notwithstanding that duplicate entries are not allowed in the LSTA list. Thus, for example, if the RTA is comprised of TAIs 1, 2 and 3 in order from top to bottom of the list, this implies that the UE recently appeared in tracking area 1, before that in tracking area 2 and prior to that in tracking area 3. Thus, if the MME pages based on a chronological order the UE appeared in different tracking areas, the MME may page tracking area 1 first, followed by tracking area 2 and lastly the MME may page tracking area 3.

Also, recall that the MME sends a T3412 timer value to the UE in the TAU accept message. After this timer expires, the UE sends tracking information to the MME if the UE has not sent tracking information since setting the timer. The idea behind this periodic tracking update is that the MME wants to know the most precise location of the UE, but if the UE comprises a large registered area neighbor list or RTA list, the UE may travel many tracking areas away from its last reported position by the time it moves outside the area comprising the RTA or neighbor list. Thus, the larger the RTA list, the shorter the MME may want to set the T3412 timer. When the MME sends the TAU accept message, the MME may set the length of the T3412 timer based on the length of the RTA list. For example, if the RTA list comprises two entries the MME may set the T3412 timer to five minutes, but if the RTA list comprises three entries the MME may set the T3412 timer to four minutes.

The MME 130 in one example employs one or more non-transitory computer-readable media. The non-transitory computer-readable media store software and/or include firmware for performing one or more portions of one or more implementations. Examples of a non-transitory computer-readable medium for the MME 130 comprise recordable data storage medium. The non-transitory computer-readable medium for the MME 130 in one example comprise one or more of a magnetic, electrical, optical, biological, and atomic data storage medium. For example, the non-transitory computer-readable medium may comprise floppy disks, magnetic tapes, CD-ROMs, DVD-ROMs, hard disk drives, and electronic memory.

The steps or operations described herein are merely examples. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, executed on at least one of a mobility management entity or an LTE network computer node comprising:
    receiving a first tracking area identifier indicating a tracking area where a user equipment (UE) is located;
    updating a registered tracking area (RTA) list for the UE based on whether the first tracking area identifier corresponds with a previously visited tracking area for the UE, wherein the RTA list comprises at least one second tracking area identifier indicating a tracking area where the UE was previously registered;
    wherein the step of updating the RTA list comprises:
        comparing the first tracking area identifier to a last seen tracking area (LSTA) list for the UE to determine whether the UE is engaged in cyclic movement;
        removing the at least one second tracking area identifier from the RTA list if the UE is not engaged in cyclic movement;
        adding the first tracking area identifier to the RTA list;
    the method further comprising the step of:
    updating the LSTA list with the first tracking area identifier.

2. The method of claim 1 further comprising, transmitting the registered tracking area list to the UE, and transmitting to the UE a timer value that is based on an allowed number of entries for the registered tracking area list.

3. The method of claim 1, further comprising initializing the last seen tracking area list and the registered tracking area list when at least one of i) an attach request is received, ii) an indication of a switch of serving gateway is received or iii) an indication of an inter-MME handover is received.

4. The method of claim 1, further comprising:
    clearing the registered tracking area list when at least one of i) a tracking area update is received because a T3412 timer expired, ii) an indication of an inter-MME handover is received or iii) a indication of serving gateway relocation is received.

5. The method of claim 1, further comprising paging the UE based on the registered tracking area list.

6. The method of claim 1, wherein a permitted number of entries are allowed for the registered tracking area list and the last seen tracking area list respectively, the permitted number of entries varying in real-time.

7. The method of claim 1 further comprising, updating the registered tracking area list to comprise only the received tracking area identifier when the received tracking area identifier is received while the UE is connected on a call.

8. An apparatus, comprising
    a mobility management entity (MME) that comprises a processor and an associated memory, the MME configured to maintain a registered tracking area (RTA) list for a user equipment (UE),
    wherein the MME is configured to update the RTA list based on tracking area updates received from the UE that indicate whether the UE is engaged in cyclic movement;
    wherein the MME is configured to remove tracking area identifiers, for tracking areas previously visited by the UE, from the RTA list if the UE is not engaged in cyclic movement; and
    wherein the MME is configured to page the UE based on tracking areas identified in the RTA list.

9. The apparatus of claim 8, wherein the MME is configured to page the UE in only a last seen tracking area and tracking areas identified in the registered tracking area list.

10. The apparatus of claim 8, wherein the MME is configured to page the UE in tracking areas identified in the registered tracking area list.

11. The apparatus of claim 8, wherein the MME is configured to page the UE based on a manually configured neighbors list and the registered tracking area list.

12. The apparatus of claim 11, wherein the MME is configured to page the UE in at least one of the neighbors list, the registered tracking area list or a last seen tracking area based on a system configurable variable.

13. The apparatus of claim 8, wherein the registered tracking area list is updated based on a last seen tracking area list for the UE.

14. The apparatus of claim 13, wherein the registered tracking area list is updated with a received tracking area identifier when the received tracking area identifier is in the last seen tracking area list.

15. The apparatus of claim 13, wherein the registered tracking area list is initialized after receipt of a periodic tracking update and the registered tracking area list is updated with a received tracking area identifier.

16. The apparatus of claim 8, wherein the MME is configured to page tracking areas comprising the registered tracking area list based on a chronological order of appearance of a tracking area identified in the registered tracking area list.

17. The apparatus of claim 8, wherein the MME is configured to page tracking areas identified in the registered tracking area list and a last seen tracking area list in a mutually exclusive manner.

* * * * *